United States Patent [19]
Boskovic et al.

[11] Patent Number: 6,118,563
[45] Date of Patent: Sep. 12, 2000

[54] METHODS AND APPARATUS FOR REDUCING FOUR-WAVE MIXING

[75] Inventors: Aleksandra Boskovic, Highland Park; Valeria Loureiro da Silva, Hillsborough, both of N.J.; Sergey Yurevich Ten, Painted Post, N.Y.

[73] Assignee: Corning Incorporated, Corning, N.Y.

[21] Appl. No.: 09/157,040

[22] Filed: Sep. 18, 1998

Related U.S. Application Data
[60] Provisional application No. 60/079,308, Mar. 25, 1998.

[51] Int. Cl.$^7$ ............................................. H04J 14/02
[52] U.S. Cl. ........................... 359/124; 359/125; 359/133; 359/161
[58] Field of Search .................................. 359/124, 125, 359/132, 161

[56] References Cited

U.S. PATENT DOCUMENTS

| | | | |
|---|---|---|---|
| 5,589,969 | 12/1996 | Taga et al. ................................ | 359/124 |
| 5,696,614 | 12/1997 | Ishikawa et al. ........................ | 359/124 |
| 5,774,243 | 6/1998 | Majima ..................................... | 359/124 |
| 5,841,557 | 11/1998 | Otsuka et al. ........................... | 359/122 |

OTHER PUBLICATIONS

Lee et al., "Periodic allocation of a set of unequally spaced channels for upgradable dense–WDM applications using dispersion–shifted fibers", OFC Procedings, 1998, FC5, pp393–394. .

Y. Hamazumi et al., "Beat Induced Crosstalk Reduction Against Wavelength Difference Between Signal and Four–Wave Mixing Lights in Unequal Channel Spacing WDM Transmission", IEEE Photonics Technology Letters, 1996, vol. 8, No. 5, pp. 718–720.

F. Forghieri et al., "Reduction of Four–Wave Mixing Crosstalk in WDM Systems Using Unequally Spaced Channels", IEEE Photonics Technology Letters, 1994, vol. 6, No. 6, pp. 754–756.

F. Forghieri et al., "WDM systems with Unequally Spaced Channels", Journal of Lightwave Technology, 1995, vol. 13, No. 5, pp. 889–896.

*Primary Examiner*—Leslie Pascal
*Attorney, Agent, or Firm*—William J. Chervenak

[57] ABSTRACT

Four-wave mixing of transmitted signals in a lightwave transmission system is reduced by (1) grouping the signals in pairs of adjacent frequencies, (2) increasing the frequency of every other pair by a fixed amount, and (3) decreasing the frequency of the remaining pairs by the same fixed amount, where the fixed amount is less than the permitted variation of the ITU grid.

20 Claims, 8 Drawing Sheets

METHODS AND APPARATUS FOR REDUCING FOUR-WAVE MIXING

This application is based upon the provisional application Ser. No. 60/079,308, filed Mar. 25, 1998, which we claim as the priority date of this application.

FIELD OF THE INVENTION

This invention relates to lightwave transmission systems and, in particular, to methods and apparatus for reducing four-wave mixing in such systems.

DESCRIPTION OF THE TECHNOLOGY

Four-wave mixing (FWM) is a non-linear effect exhibited by optical waveguide fibers when multiple wavelengths (frequencies) are simultaneously transmitted down the fiber as in, for example, wavelength division multiplexing (WDM). In particular, three signals at frequencies $f_1$, $f_2$, and $f_3$ generate a set of fourth "cross-talk" signals at frequencies $f_4$, where the first $f_4$ is given by:

$$f_4 = f_1 + f_2 - f_3$$

and the rest of the $f_4$'s are given by all the other combinations of adding two of the frequencies and subtracting the third. In all, if one starts with three signal frequencies, four-wave mixing produces nine $f_4$'s. For "N" starting frequencies, the number of four-wave mixing products becomes increasingly larger since each permutation of three of the frequencies can generate a FWM tone.

The strength of the FWM signals depends on the power levels at the original starting frequencies, the fiber dispersion, and the channel spacing. The use of optical amplifiers to achieve longer unrepeated lengths in optical fiber transmission systems has resulted in higher power levels and thus stronger FWM signals. In addition, when dispersion-shifted fibers are used, four-wave mixing is enhanced as a result of the reduction of the phase mismatch naturally provided by fiber dispersion.

The International Telecommunication Union's standards for dense wavelength division multiplexed systems further exasperate the problem. Specifically, the ITU has specified that WDM systems should have equal frequency spacing between channels within a certain tolerance, e.g., a 200 GHz channel spacing with a tolerance of ±40 GHz about the center frequency of each channel (the ITU grid). Exactly equal spacing means that many of the four-wave mixing products will coincide with (overlap with) the channel frequencies. Cross-talk is thus maximized when the ITU standards are achieved, i.e., when the center frequency for each signal is at the ITU standard.

As a result of these considerations, four-wave mixing is today one of the limiting non-linear processes in optical fiber transmission systems.

A number of proposals which employ unequal spacing between signal channels to address this problem have appeared in the literature. See J-S. Lee and D-H. Lee, *OFC Proceedings*, FC5, 393 (1998); Y. Hamazumi, M. Koga and K. Sato, *IEEE Photonics Technol. Lett.*, 8, 718 (1996); F. Forghieri, R. W. Tkach, A. R. Chraplyvy, and D. Marcuse, *IEEE Photonics Technol. Lett.*, 6, 754 (1994); and F. Forghieri, R. W. Tkach, and A. R. Chraplyvy, *J. Lightwave Technol.*, 13, 889 (1995).

These schemes for locating signal channels suffer from a number of deficits. First, they rely on extensive mathematical calculations to find the optimum position of the channels, i.e., the position where minimum overlap with the FWM components is achieved. Although these algorithms can find the optimum position where the FWM penalties are at their minimum, the resulting channel positions are complicated to implement in practice since they involve a set of channel frequencies which have no simple-to-understand relationship to one another.

Second, the schemes leave numerous unused slots between channels which results in a significant expansion of the transmission bandwidth, a clearly undesirable result since the overall goal of wavelength division multiplexing is to place as many channels as possible into a given bandwidth.

Third, the schemes generally do not result in channel locations which meet the requirements of the ITU grid. Thus, although they can reduce four-wave mixing, such reduction may be at the expense of standardization of WDM technology on a worldwide basis.

SUMMARY OF THE INVENTION

In view of the foregoing, it is an object of the present invention to provide improved methods and apparatus for reducing four-wave mixing in lightwave transmission systems. More particularly, it is an object of the invention to provide such methods and apparatus which (1) are simple to implement in practice, (2) do not involve a substantial increase in bandwidth, and (3) readily satisfy the ITU standards for WDM systems.

To achieve these and other objects, the invention provides lightwave transmission systems and methods for operating such systems wherein the system comprises a plurality of light sources having the following properties:

(1) the light sources operate at nominal frequencies separated from one another by a nominal frequency spacing $\Delta F$;

(2) the light sources are grouped from lowest nominal frequency to highest nominal frequency in pairs of adjacent nominal frequencies;

(3) the frequency of every other pair is increased by $\Delta v$; and (4) the frequency of the remaining pairs is decreased by $\Delta v'$;

where $\Delta v$ and $\Delta v'$ are both less than $\Delta F$ and at least one of $\Delta v$ and $\Delta v'$ is greater than zero.

If the number of light sources (N) is not an even number, one of the pairs will include only one light source. If the pairs are numbered, e.g., 1, 2, 3, . . . N/2, the pairs having an increased frequency can be either the even or odd numbered pairs.

In accordance with certain preferred embodiments of the invention, the nominal frequencies have a tolerance of $\pm\delta F$, and the values of $\Delta v$ and $\Delta v'$ are each less than or equal to $\delta F$. For example, in accordance with the current ITU grid, $\Delta F$ is 200 and $\delta F$ is 40 GHz, in which case, $\Delta v$ and $\Delta v'$ are each less than or equal to 40 GHz. In the future, $\Delta F$ and $\delta F$ can be expected to be reduced to 100 GHz and 20 GHz, respectively, to meet the ever growing demand for higher data rates, in which case, $\Delta v$ and $\Delta v'$ will preferably be less than or equal to 20 GHz. In some cases, $\Delta v$ and $\Delta v'$ can be less than 10 GHz, e.g., where the channel precision is required to ±10 GHz.

In accordance with other preferred embodiments, $\Delta v$ and $\Delta v'$ are both greater than zero and $\Delta v = \Delta v'$.

Mathematically, the frequencies of the light sources can be expressed as follows:

$$v_n = v_1 + (n-1) \cdot \Delta F \quad n=1 \text{ to } N \tag{1}$$

$$v_n^* = v_n \pm \Delta v \quad n=1, 2, 5, 6, \ldots, 4j+1, 4j+2, \ldots n \leq N \tag{2}$$

$$v_n^* = v_n \mp \Delta v' \quad n=3, 4, 7, 8, \ldots, 4j+3, 4j+4, \ldots n \leq N \tag{3}$$

where the $v_n$'s are the nominal frequencies, the $v_n^*$'s are the operating (shifted) frequencies, and the "$\pm$" and "$\mp$" terminology indicates that if the first series of frequencies is up-shifted then the second series is down shifted and vice versa.

Although less preferred, some reduction in four-wave mixing can be achieved by alternate shifting of individual frequencies, rather than pairs of frequencies. Mathematically, the operating frequencies can then be expressed as:

$$v_n^* = v_n \pm \Delta v \quad n=1, 3, 5, 7, \ldots, 2j+1, \ldots n \leq N \tag{4}$$

$$v_n^* = v_n \mp \Delta v' \quad n=2, 4, 6, 8, \ldots, 2j, \ldots n \leq N \tag{5}$$

The preferred embodiments discussed above for shifting pairs of frequencies also apply to shifting of individual frequencies.

It should be noted that as used herein and in the claims, $\Delta F$, $\delta F$, $\Delta v$, and $\Delta v'$ represent magnitudes, i.e., none of them can be negative.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention. The drawings are not intended to indicate scale or relative proportions of the elements shown therein.

DETAILED DESCRIPTION OF THE INVENTION

As discussed above, the present invention relates to lightwave transmission systems which employ wavelength detuning to achieve reduced levels of four-wave mixing.

Figure 1:
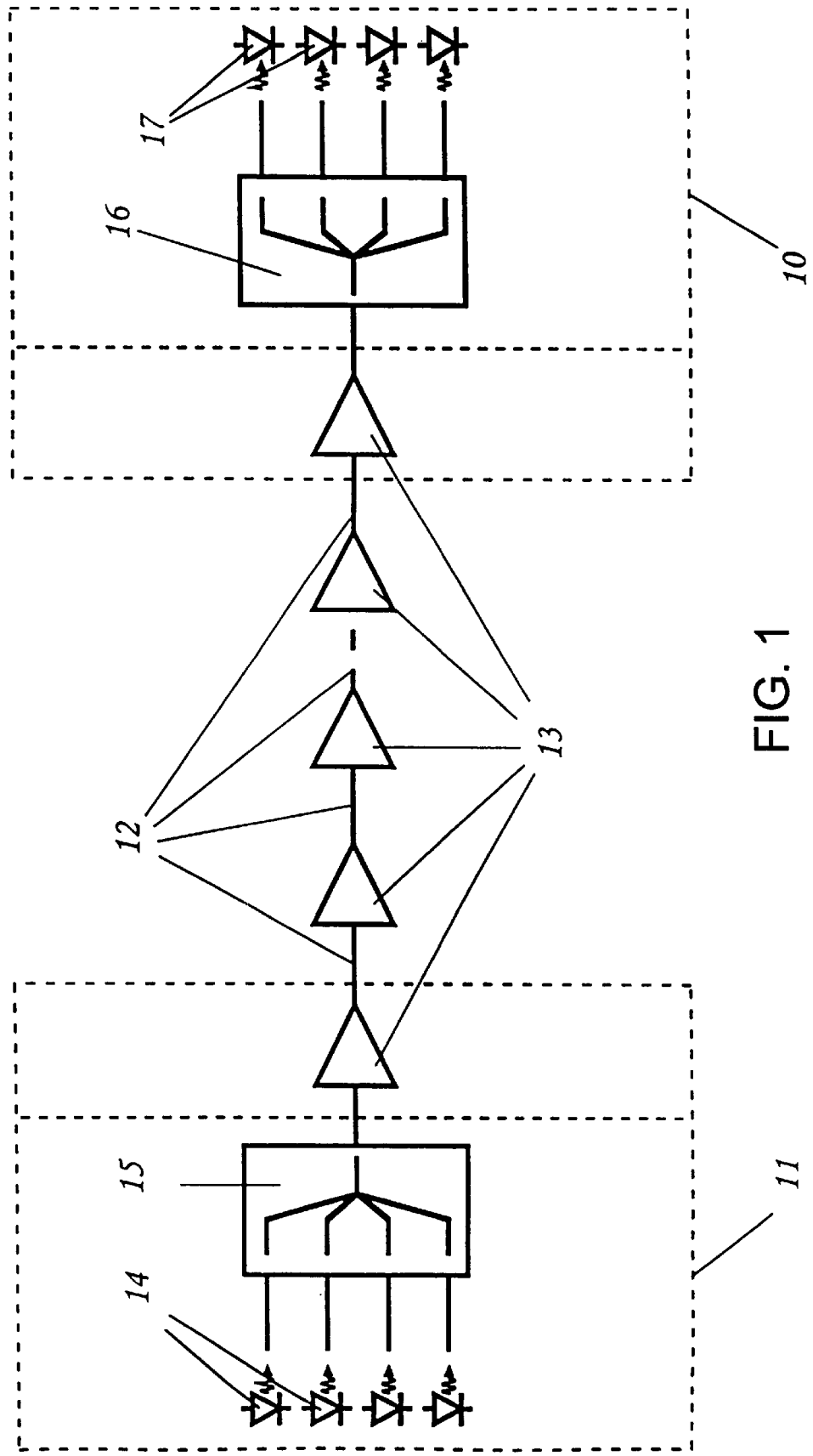
FIG. 1 schematically represents a WDM transmission system which can employ the present invention.

FIG. 1 illustrates a representative optical transmission system in which the invention can be used. Although this figure illustrates point-to-point transmission, it is to be understood that the invention is equally applicable to networks of a variety of architectures.

As shown in FIG. 1, a WDM receiver indicated generally at 10 is optically coupled with a WDM transmitter indicated generally at 11 by means of transmission path 12, in the form of an optical fiber that includes a concatenation of optical amplifiers 13 spaced along the fiber to amplify signals transmitted between the transmitter 11 and the receiver 10.

The transmitter 11 has a plurality of data-modulated light sources 14 (for convenience of illustration only four such sources are indicated in the figure) operating at different wavelengths, typically in the waveband extending from about 1525 nm to about 1570 nm (C-band). Alternatively, the signals can be in the 1300 nm band and/or the 1600 nm band (L-band). Also for simplicity, FIG. 1 shows a receiver and transmitter, whereas a pair of transceivers could be used if desired.

The plurality of wavelengths is multiplexed on to the common transmission path 12 by means of a wavelength multiplexer 15. Optionally, the transmitter may include one of the concatenation of amplifiers 13. The receiver has a wavelength demultiplexer 16, the counterpart to the multiplexer 15 of the transmitter. The outputs of the demultiplexer 16 feed the individual demultiplexed signal channels to associated detectors 17. The receiver may similarly include one of the concatenation of amplifiers 13 as a preamplifier located upstream of the demultiplexer. Each of optical amplifiers 13 can be a single stage or multi-stage amplifier.

In accordance with the invention, the wavelengths (frequencies) of the light sources 14 are selected in accordance with equations (1)–(3) above or, less preferably, in accordance with equations (1) and (4)–(5).

Figure 2:
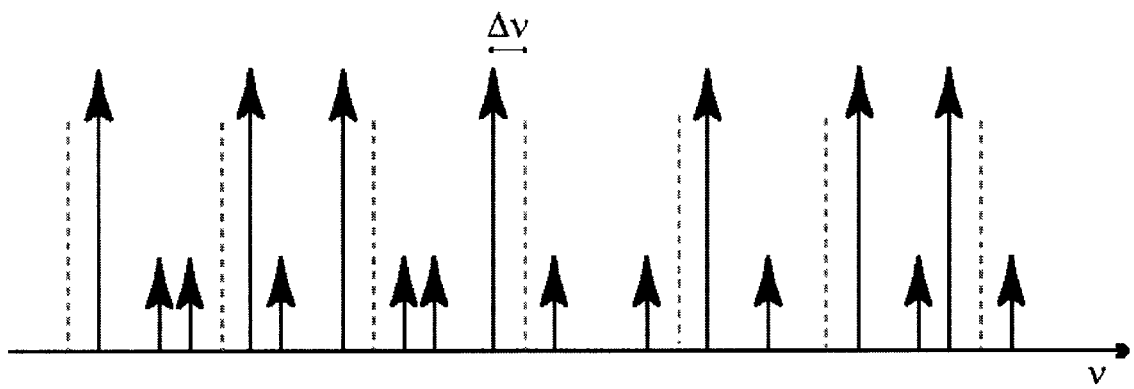
FIG. 2 schematically illustrates a representative channel plan in accordance with the invention.

FIG. 2 illustrates a typical frequency distribution for the case of pair shifting with $\Delta v'$ equal to $\Delta v$. In this figure, the dashed lines represent the equal channel spacing positions, the long arrows the positions for the channels in accordance with invention, and the short arrows the first order FWM products. For this simple-to-implement scheme, FWM components generated by any pair of adjacent channels are detuned from the closest channels to this pair. Moreover, any pair of channels separated by two channel spacings do not generate FWM components which overlap with any channel frequency.

Quantitatively, by detuning the channels by $\Delta v$ from their central frequency, most first order FWM components are at least $2\Delta v$ apart from any channel. By means of this factor of two, $\Delta v$ can be made small enough so that the channel positions still conform with the ITU grid while at the same time being large enough to achieve a substantial reduction in four-wave mixing as illustrated by the following non-limiting examples.

EXAMPLE 1

Determination of FWM Penalty Bandwidth

FWM penalties should occur only if the spacing between the channel and the FWM tone falls inside the electrical bandwidth of the receiver (RX). The frequency detuning required in order to avoid FWM penalties in a 2.5 Gbit/s system has been determined previously (see Hamazumi et al., supra). A 10 Gbit/s system, however, has a broader RX bandwidth and this will affect the FWM penalty bandwidth.

In order to perform this measurement, three channels spaced by 200±0.6 GHz, modulated at 10 Gbit/s, were propagated through a single piece of low dispersion fiber.

The precision with which the channels' frequencies were set (0.6 GHz) could just be obtained by using a high accuracy wavemeter and could not be observed in a standard OSA (0.1 nm resolution).

Figure 3:
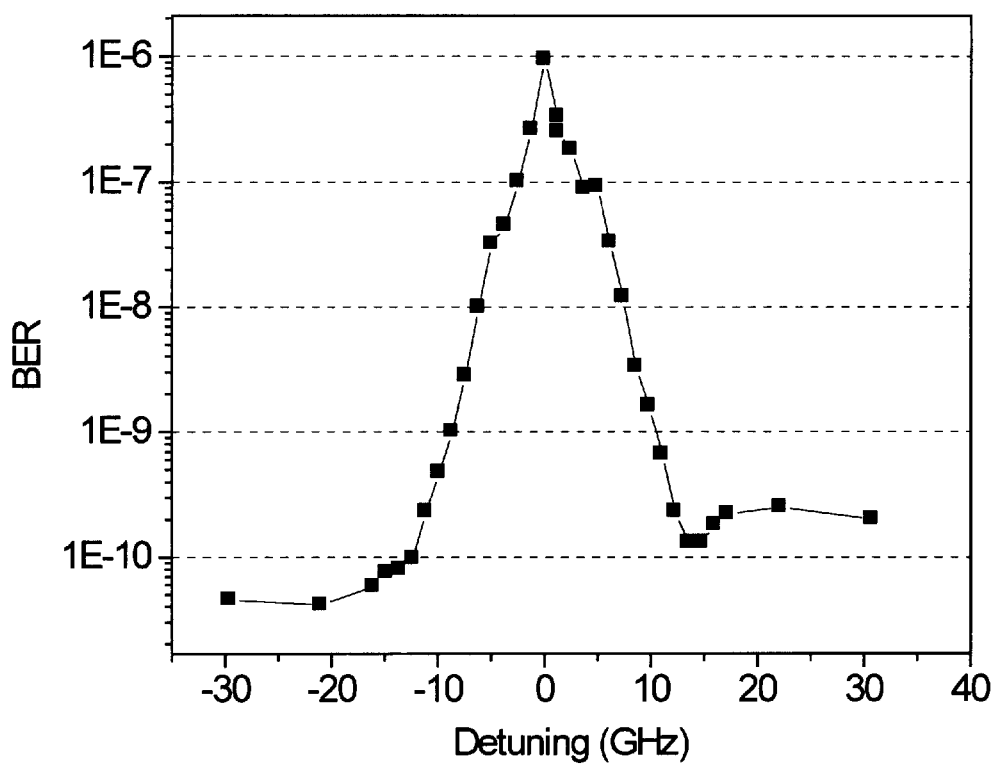
FIG. 3 illustrates the effects of channel alignment on the BER (bit error rate) for a single FWM tone and 20 dB of cross-talk.

The BER was measured for one of the channels at the edge of the channel plan as a function of the channel frequency position. The results of these measurements are set forth in FIG. 3. As shown therein, detuning the channel had a drastic impact on the BER. Moreover, the bandwidth of the effect (~9 GHz at 3 dB and ~25 GHz at the base) is limited by the receiver (RX) bandwidth.

It should be noted that for 2.5 Gbit/s, this bandwidth would be four times smaller (if the same ratio between the modulation frequency and electrical bandwidth was maintained), requiring a much smaller detuning to avoid FWM interference. Looked at another way, the smaller RX bandwidth of a 2.5 Gbit/s system allows for a closer than 100 GHz channel spacing without increasing the required tolerance on channel wavelength.

The results of this example show that in order to demonstrate system performance under the effect of FWM it is necessary to control the alignment of the WDM channels with an accuracy significantly better than the bandwidth of the RX.

EXAMPLE 2

Effects of Detuning a Single Channel of a WDM System

Figure 4:
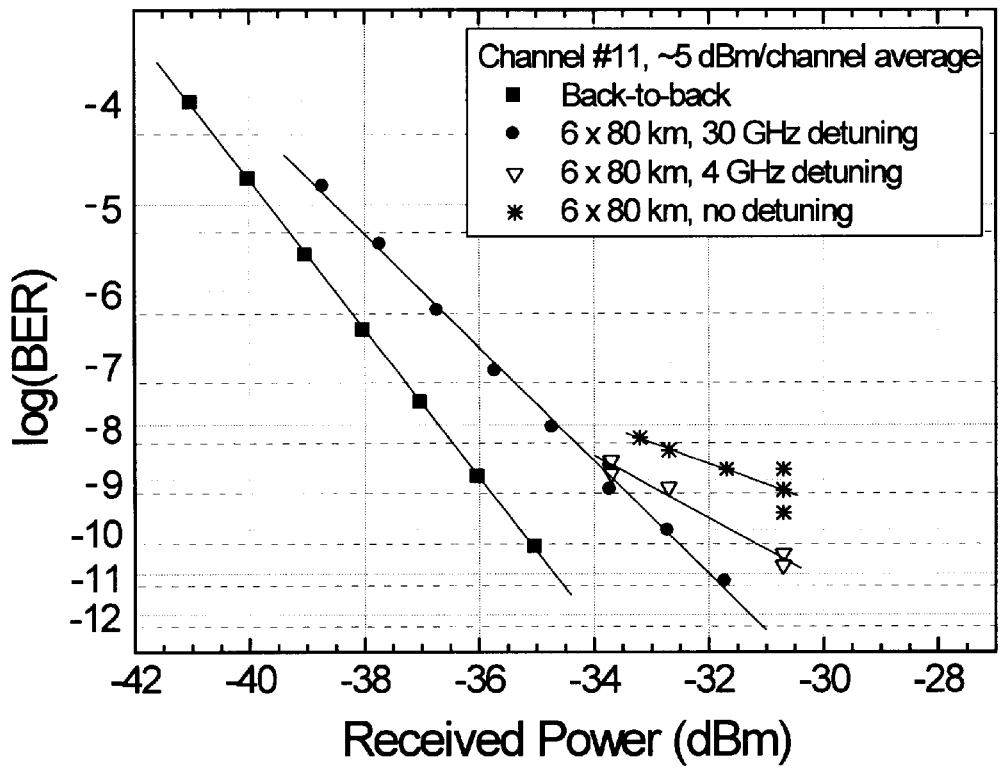
FIG. 4 is a plot of BER as a function of received power for different amounts of frequency detuning of the worst channel (#11) of a 16-channel WDM system. Plots of the type shown in FIG. 4 will be referred to herein as "waterfall curves" or simply "waterfalls."

In order to quantify the impact of channel alignment in a WDM system, a 16-channel (100±0.6 GHz spacing) system was characterized. The system parameters were such that the performance was dominated by FWM. The effect of detuning the worst performing channel (#11) while keeping all other channels constant is shown in FIG. 4.

As can be seen in this figure, an improvement of 2 dB in power penalty at a BER of $10^{-9}$ was observed when channel 11 was detuned by 4 GHz. Looked at another way, this figure shows that a slight detuning (~5 GHz) from the center frequency of a given channel can decrease the observed BERs by more than one order of magnitude.

No apparent floor was observed when 30 GHz of detuning was used. However, 30 GHz is a relatively large detuning and may result in the channel frequency falling outside the ITU grid. As discussed above, the ITU tolerance for 200 GHz channel spacing is ±40 GHz and the tolerance for 100 GHz spacing can be expected to be ±20 GHz.

EXAMPLE 3

Effects of Paired Detuning of the Channels of a WDM System

The channel plan of FIG. 2 was tested in a 10 Gbit/s, WDM, dispersion managed transmission system with seven spans (80 km long) of dispersion managed fiber and seven fiber amplifiers. The channels were temperature tuned and the frequencies were set with an accuracy of 0.6 GHz.

The performance of the system was characterized by measuring the bit error rate (BER) as a function of the power into the receiver (waterfall measurement). Sixteen channels were transmitted, with 100 GHz spacing (equal channel spacing), and the waterfall was measured for each channel after transmission. The channel with the highest amount of degradation due to FWM and cross-phase modulation was channel 11 and therefore was chosen as the test channel.

Figure 5:
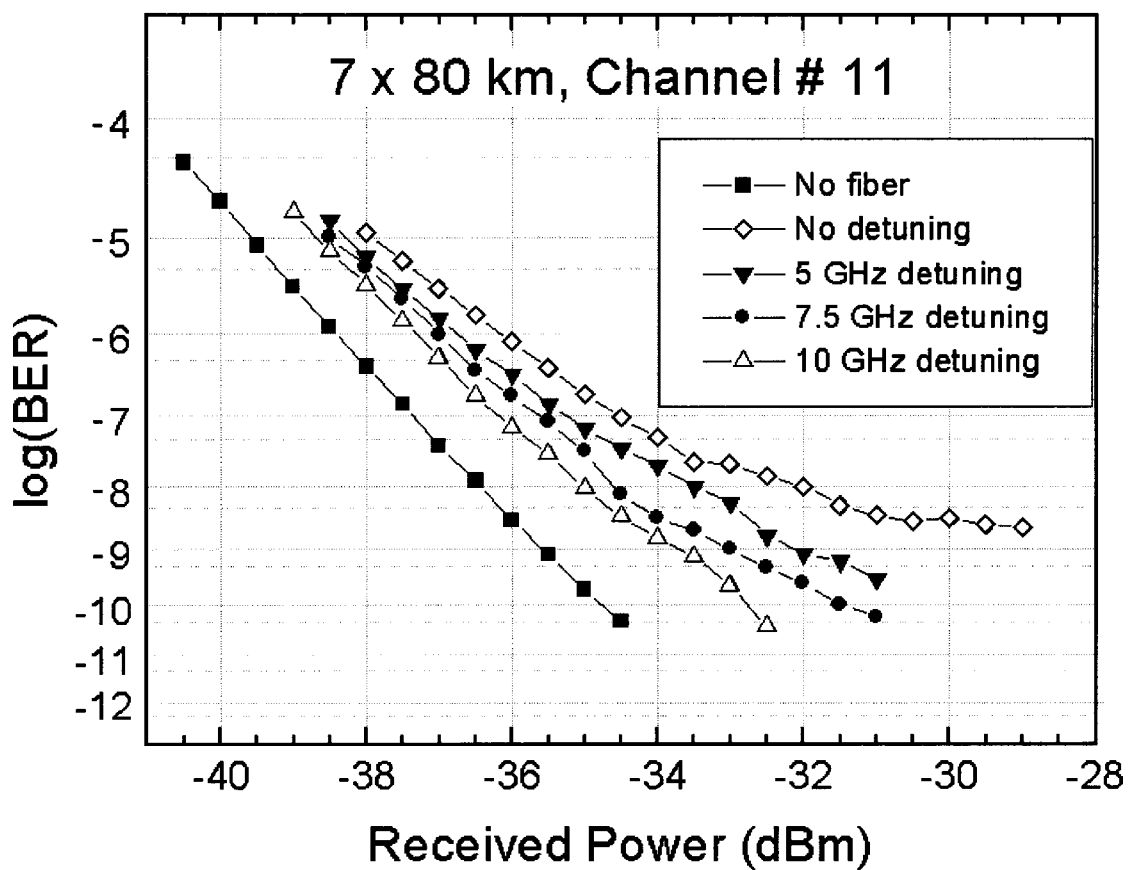
FIG. 5 shows waterfalls for channel 11 after transmission over seven 80 km spans of dispersion managed fiber. The various curves show the no fiber (back-to-back) case, the full transmission case with no detuning, and the full transmission case with various levels of detuning.
Figure 6:
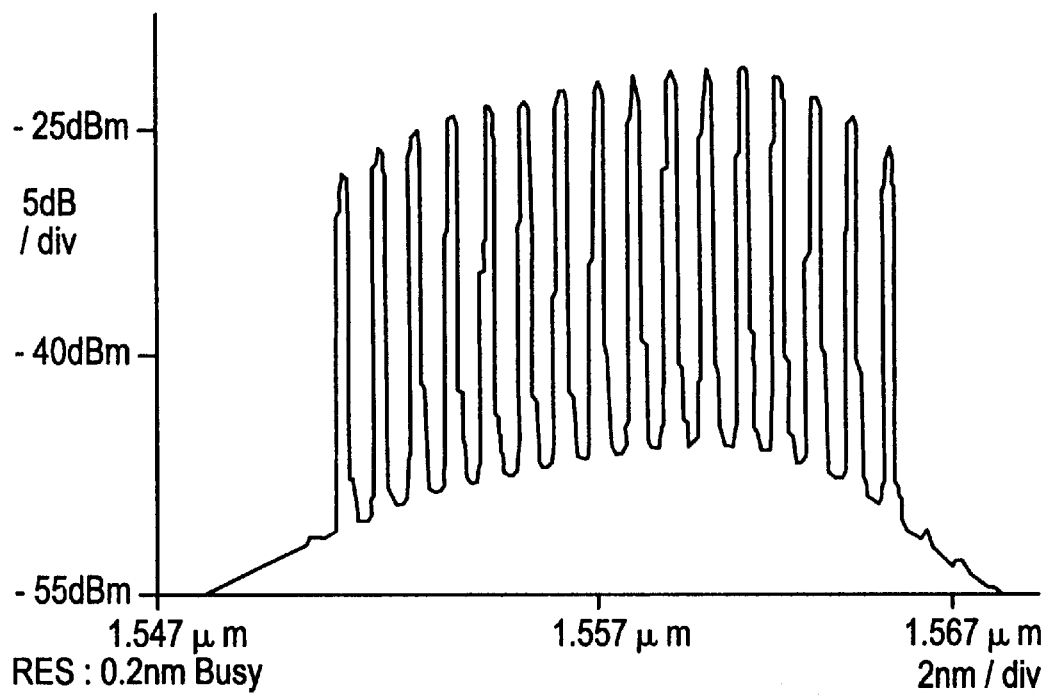
FIGS. 6, 7, and 8 are spectra for no detuning, 5 GHz detuning, and 10 GHz detuning, respectively. The FWM sidebands in FIG. 6 appear to be very weak due to the resolution of the OSA even though significant FWM penalties are present.

FIG. 5 shows the waterfall for channel 11 for the no fiber (back-to-back) case and after transmission with no detuning from the center frequency specified by the ITU grid. It can be seen that a strong floor is present for the transmission case and the power penalty at a BER of $10^{-9}$ is so large that it cannot be calculated from the graph. The spectrum for the transmission case without detuning is shown in FIG. 6.

Figure 7:
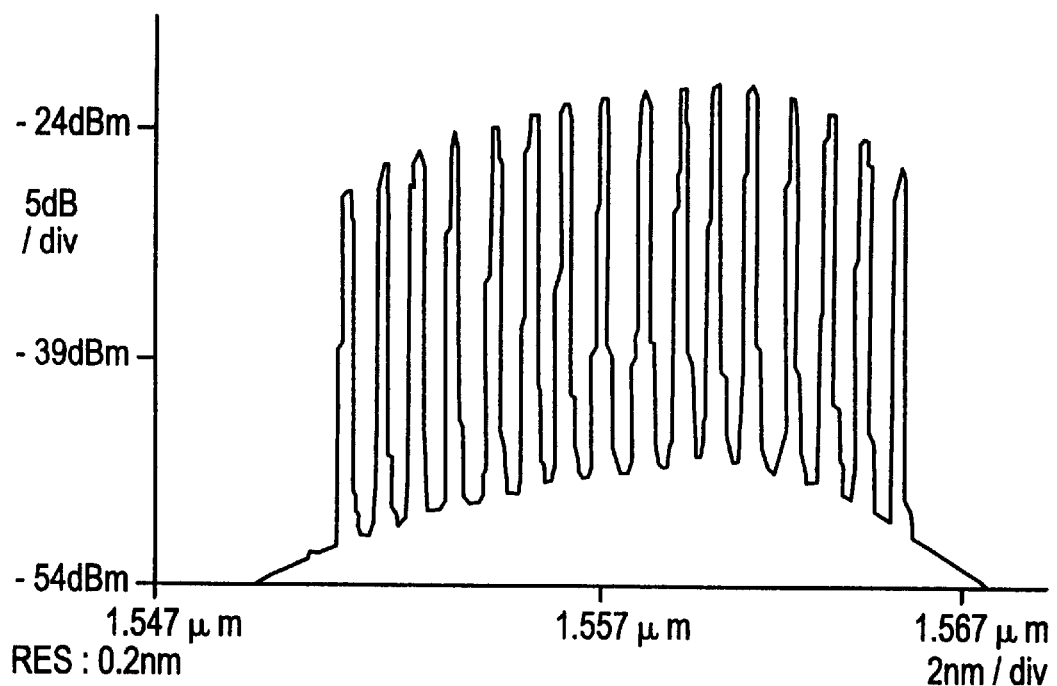

In order to decrease the penalties due to FWM, the channel plan of FIG. 2 was implemented first with a $\Delta v$ of 5 GHz and the corresponding spectrum can be seen in FIG. 7. It is important to note that the detuning is quite small and in fact cannot be noticed on the spectrum analyzer trace of this figure. Nevertheless, as shown in FIG. 5, there is a strong improvement of the waterfall curve and the power penalty for a BER of $10^{-9}$ can now be calculated and is 3.5 dB.

Figure 8:
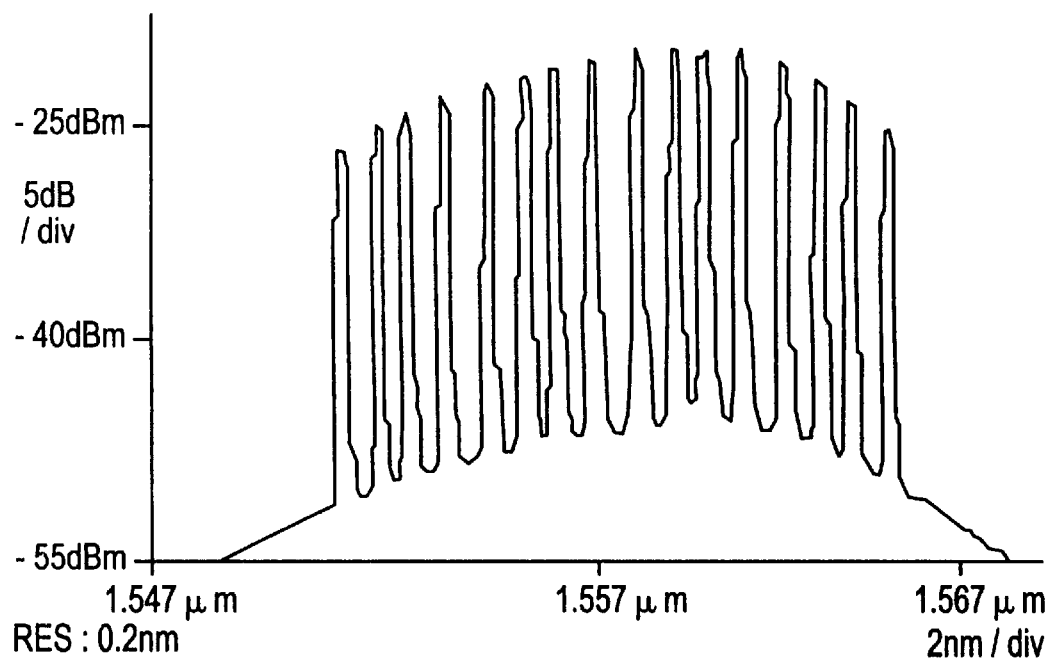

As a test of whether the power penalty could be further decreased, the detuning was increased to 10 GHz. The detuning can now be observed in the spectrum analyzer (see FIG. 8) and the corresponding waterfall (FIG. 5) shows a power penalty at $10^{-9}$ BER of only 2.5 dB, representing an improvement of 1 dB over the 5 GHz case. Looked at another way, these results show that a detuning of 10 GHz significantly decreased the floor observed on the curves of the BER as a function of the received power, while the sensitivity was improved by 3 dB at $10^{-8}$ BER.

As the foregoing results show, by taking advantage of the limited bandwidth of FWM impairments, the channel plan of FIG. 2 reduces the FWM penalties in WDM systems, while still operating within the ITU standards.

Although preferred and other embodiments of the invention have been described herein, further embodiments may be perceived by those skilled in the art without departing from the scope of the invention as defined by the following claims.

What is claimed is:

1. A method of operating a lightwave transmission system which transmits a plurality of signals at nominal frequencies separated from one another by a nominal frequency spacing $\Delta F$, said method comprising:
   (a) grouping said nominal frequencies from lowest nominal frequency to highest nominal frequency in pairs of adjacent nominal frequencies;
   (b) increasing the frequency of every other pair by $\Delta v$; and
   (c) decreasing the frequency of the remaining pairs by $\Delta v'$; where $\Delta v$ and $\Delta v'$ are both less than $\Delta F$ and at least one of $\Delta v$ and $\Delta v'$ is greater than zero.

2. The method of claim 1 where:
   (i) the nominal frequencies have a tolerance of $\delta F$; and
   (ii) $\Delta v$ and $\Delta v'$ are both less than or equal to $\delta F$.

3. The method of claim 2 wherein:
   $\Delta F \approx 200$ GHz;
   $\delta F \approx 40$ GHz;
   $\Delta v \leq 40$ GHz; and
   $\Delta v' \leq 40$ GHz.

4. The method of claim 2 wherein:
   $\Delta F \approx 100$ GHz;
   $\delta F \approx 20$ GHz;
   $\Delta v \leq 20$ GHz; and
   $\Delta v' \leq 20$ GHz.

5. The method of claim 1 where $\Delta v$ and $\Delta v'$ are both greater than zero and $\Delta v = \Delta v'$.

6. A method of operating a lightwave transmission system which transmits a plurality of signals at nominal frequencies separated from one another by a nominal frequency spacing $\Delta F$, said method comprising:

(a) ordering said nominal frequencies from lowest nominal frequency to highest nominal frequency;

(b) increasing every other frequency by $\Delta v$; and (c) decreasing the remaining frequencies by $\Delta v'$; where $\Delta v$ and $\Delta v'$ are both less than $\Delta F$ and at least one of $\Delta v$ and $\Delta v'$ is greater than zero.

7. The method of claim 6 where:

(i) the nominal frequencies have a tolerance of $\delta F$; and (ii) $\Delta v$ and $\Delta v'$ are both less than or equal to $\delta F$.

8. The method of claim 7 wherein:

$\Delta F \approx 200$ GHz;

$\delta F \approx 40$ GHz;

$\Delta v \leq 40$ GHz; and $\Delta v' \leq 40$ GHz.

9. The method of claim 7 wherein:

$\Delta F \approx 100$ GHz;

$\delta F \approx 20$ GHz;

$\Delta v \leq 20$ GHz; and $\Delta v' \leq 20$ GHz.

10. The method of claim 6 where $\Delta v$ and $\Delta v'$ are both greater than zero and $\Delta v = \Delta v'$.

11. A lightwave transmission system comprising a plurality of light sources, wherein said light sources:

(A) operate at nominal frequencies separated from one another by a nominal frequency spacing $\Delta F$; and (B) are grouped from lowest nominal frequency to highest nominal frequency in pairs of adjacent nominal frequencies wherein:

(i) the frequency of every other pair is increased by $\Delta v$; and (ii) the frequency of the remaining pairs is decreased by $\Delta v'$;

where $\Delta v$ and $\Delta v'$ are both less than $\Delta F$ and at least one of $\Delta v$ and $\Delta v'$ is greater than zero.

12. The lightwave transmission system of claim 11 where:

(a) the nominal frequencies have a tolerance of $\delta F$; and (b) $\Delta v$ and $\Delta v'$ are both less than or equal to $\delta F$.

13. The lightwave transmission system of claim 12 wherein:

$\Delta F \approx 200$ GHz;

$\delta F \approx 40$ GHz;

$\Delta v \leq 40$ GHz; and $\Delta v' \leq 40$ GHz.

14. The lightwave transmission system of claim 12 wherein:

$\Delta F \approx 100$ GHz;

$\delta F \approx 20$ GHz;

$\Delta v \leq 20$ GHz; and $\Delta v' \leq 20$ GHz.

15. The lightwave transmission system of claim 11 where $\Delta v$ and $\Delta v'$ are both greater than zero and $\Delta v = \Delta v'$.

16. A lightwave transmission system comprising a plurality of light sources, wherein said light sources:

(A) operate at nominal frequencies separated from one another by a nominal frequency spacing $\Delta F$;

(B) are ordered from lowest nominal frequency to highest nominal frequency;

(C) have the frequency of every other light source increased by $\Delta v$; and (D) have the frequency of the remaining light sources decreased by $\Delta v'$;

where $\Delta v$ and $\Delta v'$ are both less than $\Delta F$ and at least one of $\Delta v$ and $\Delta v'$ is greater than zero.

17. The lightwave transmission system of claim 16 where:

(a) the nominal frequencies have a tolerance of $\delta F$; and (b) $\Delta v$ and $\Delta v'$ are both less than or equal to $\delta F$.

18. The lightwave transmission system of claim 17 wherein:

$\Delta F \approx 200$ GHz;

$\delta F \approx 40$ GHz;

$\Delta v \leq 40$ GHz; and $\Delta v' \leq 40$ GHz.

19. The lightwave transmission system of claim 17 wherein:

$\Delta F \approx 100$ GHz;

$\delta F \approx 20$ GHz;

$\Delta v \leq 20$ GHz; and $\Delta v' \leq 20$ GHz.

20. The lightwave transmission system of claim 16 where $\Delta v$ and $\Delta v'$ are both greater than zero and $\Delta v = \Delta v'$.

* * * * *